United States Patent [19]

Leinonen

[11] Patent Number: 4,601,106
[45] Date of Patent: Jul. 22, 1986

[54] VIBRATION ATTENUATOR
[75] Inventor: Pertti Leinonen, Espoo, Finland
[73] Assignee: Suunto Oy, Finland
[21] Appl. No.: 722,462
[22] Filed: Apr. 12, 1985
[30] Foreign Application Priority Data Apr. 13, 1984 [FI] Finland .................................. 84 1490

[51] Int. Cl.$^4$ .............................................. G01C 17/08
[52] U.S. Cl. .................................. 33/356; 33/355 R; 33/364
[58] Field of Search ...................... 33/356, 355 R, 364

[56] References Cited

U.S. PATENT DOCUMENTS

| | | | |
|---|---|---|---|
| 1,424,804 | 8/1922 | Day | 33/364 |
| 2,552,332 | 5/1951 | LeVan | 33/355 |
| 2,653,390 | 9/1953 | White et al. | 33/355 |
| 2,696,054 | 12/1954 | Baker | 33/355 |
| 2,775,045 | 12/1956 | Kadlec | 33/364 |
| 4,453,317 | 6/1984 | Rahn | 33/364 |

Primary Examiner—Willis Little
Attorney, Agent, or Firm—Steinberg & Raskin

[57] ABSTRACT

A vibrator attenuator, especially for a compass. The vibration attenuator is situated to prevent transfer of vibrations from the fastening base of a compass, e.g. from the framework of a boat, to the compass rose, to prevent revolving of the compass rose that results from such vibrations, and to prevent transfer of external impacts to the compass rose itself. The vibration attenuator is disposed between a supporting rod of a bearing of the compass rose, and a frame of the compass, so as to resiliently interconnect the supporting rod and frame. The vibration attenuator is preferably attached to a supporting bridge in turn affixed to the compass frame. The vibration attenuator may be an elastic member or a spring, which is attached to the supporting rod and to the supporting bridge, so that the vibration attenuator is resilient in both a vertical or longitudinal direction, and in a lateral or horizontal direction.

15 Claims, 1 Drawing Figure

U.S. Patent    Jul. 22, 1986    4,601,106
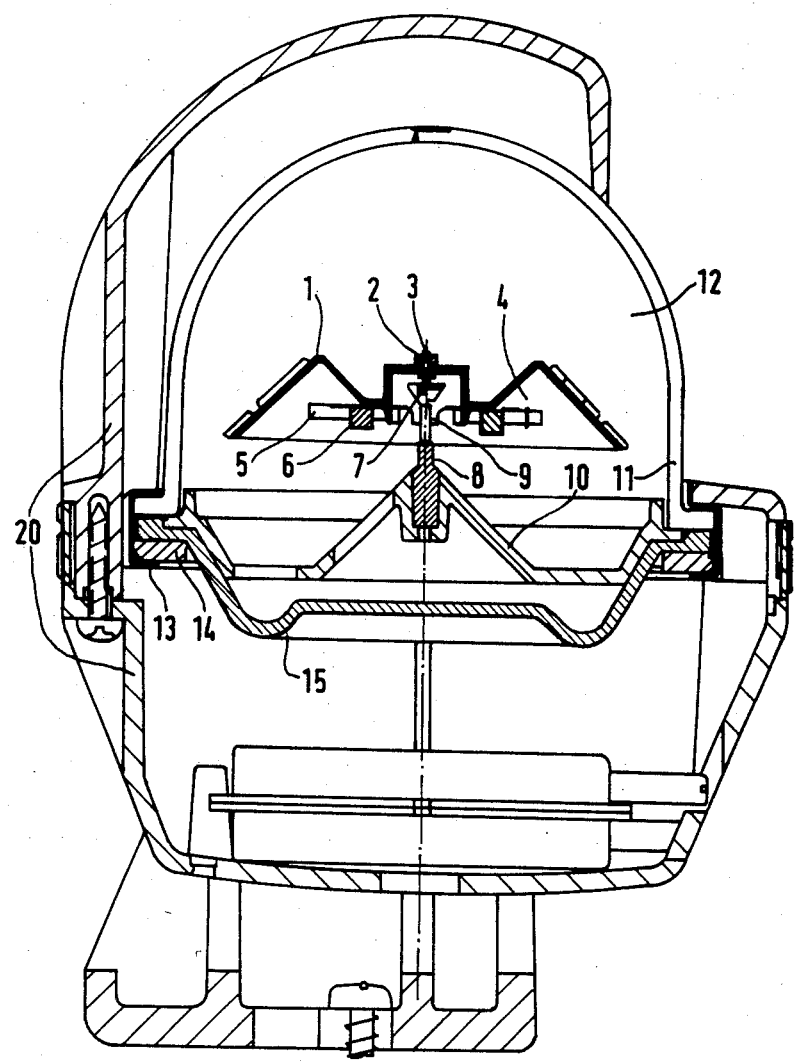

VIBRATION ATTENUATOR

BACKGROUND OF THE INVENTION

The present invention is directed to a vibration attenuator, in particular for a compass. The attenuator is disposed to attenuate or prevent transfer of vibrations from a fastening base of the compass, e.g. from the framework of a boat in which the compass is disposed, to the compass rose itself. Revolving of the compass rose that results from such vibrations is attenuated or prevented, while the present invention also attenuates or prevents transfer of any external force or impact, to the compass rose itself.

In boats and equivalent vessels, a liquid compass is used in which a compass rose for indicating direction is disposed inside a liquid dome, and is completely immersed in liquid. In the use of such compasses, a problem has been the transfer of vibrations and oscillations to the compass from the framework of the boat or equivalent vessel. Vibration of the compass results in several drawbacks, for example wear of the compass bearing, and revolving movement of the compass rose as the bearing support hits against interior structures or components of the compass rose. In such compasses, i.e. in the construction of the compass rose, there is always some part or component at the lower edge of the compass rose around the bearing support, which prevents the compass rose from falling out of position, e.g., due to the effect of the vibrations. This component or part placed around the support, is located very near the support, so that this component or part may readily hit against the support, due to the vibrations.

The problem described above, and the disadvantages resulting from the same, have already been recognized for a long time, and attempts have been made to solve this problem in several different ways. In one of these solutions, the bearing of the compass is attached to the support by an intermediate vertical spiral spring, so that the bearing may move vertically. In this manner, detrimental effects of vertical impact upon the bearing is eliminated. However, such a structure does not prevent revolving of the compass rose, or the effect of lateral impact, because the spring has been arranged so that it is resilient only in the vertical direction.

Transfer of vibration to the compass may also be prevented so that the entire compass is affixed to the boat framework or equivalent structure, by an intermediate spring arrangement. In addition to this spring arrangement, such a structure also requires shock absorption, so that the system becomes large and expensive.

SUMMARY OF THE INVENTION

Accordingly, it is an object of the present invention to improve over the previously-noted drawbacks with respect to the prior art.

It is also an object of the present invention to attenuate vibrations and/or impact from reaching a compass rose within a compass.

It is another object of the present invention to provide for simple, inexpensive, attenuation of vibration and/or impact in a compass.

It is a further object of the present invention to reduce wearing of a bearing within a compass.

It is still another object of the present invention to prevent wear and/or damage at the point of contact of a compass rose with a supporting bearing in a compass.

It is even a further object of the present invention to provide for attenuation effect of vibration and/or impact in a compass, in more than one direction only.

It is even another object of the present invention, to attenuate undesirable revolving of a compass rose due to external impact and/or vibration.

These and other objects are attained by the present invention which provides means for attenuating vibration and/or impact, which are situated between a support of a bearing of a compass rose, and a frame of the compass, so that the support and the frame are resiliently interconnected.

One of the most important advantages of the present invention, is that vibrations are not transferred up to the bearing, whereby the wear upon the bearing is reduced. With the present invention, breaking of the bearing jewel or flattening of the supporting point in the compass, is also attenuated or prevented when the apparatus or compass is subjected to strong impact. A most important advantage is, however, that vibrations are not carried up to the compass rose itself, so that the compass rose does not end up revolving, due to such vibrations.

BRIEF DESCRIPTION OF THE DRAWING

The present invention will be described in greater detail below, with reference to the accompanying drawing which is a sectional view of a compass into which a vibration attenuator in accordance with the present invention, has been disposed. The drawing has been simplified so that certain components, which do not essentially relate to the present invention, have been omitted.

DETAILED DESCRIPTION OF THE PREFERRED EMBODIMENT

Referring to the drawing, the compass illustrated in the figure comprises a dome 11 and an expansion membrane 15, which are attached to each other by way of a collar 13, and a filler ring 14, so that the dome 11 and the expansion membrane 15 together form a hermetically sealed space 12. The dome 11 and the expansion membrane 15 are rigidly attached to the compass frame 20. The space 12 is completely filled with filling liquid for the compass.

A support bridge 10 is mounted inside the space 12, the support bridge 10 being supported on the dome 11 and the expansion membrane 15, and, thereby, upon the compass frame 20. The space 12 includes a compass rose 1, which is completely surrounded by the liquid, and to which the support tip 3 of the compass rose is attached, by way of a sleeve 2.

A magnetic holder 5 is stationarily mounted in conjunction with the compass rose 1, with a magnet 6 and a weight 4 being attached to the magnetic holder 5. The support tip 3 of the compass rose, which may be made, for example, of hard metal, rests upon a bearing jewel 7, so that the compass rose 1 itself remains in balance.

The bearing jewel 7 is stationarily mounted upon a support 9, which is in turn attached to the support bridge 10 by an intermediate vibration attenuator 8, in accordance with the present invention. The support 9 is illustrated as a substantially oblong, rod-shaped member, and will be subsequently referred to as a support rod. In the embodiment illustrated in the drawing, the vibration attenuator 8 is a resilient element of rubber.

However, the vibration attenuator 8 may be formed of any elastic or resilient piece or component whatsoever, that attenuates impact, i.e. acts in the manner of a spring in all directions. Thus, the vibration attenuator may be, for example, a spiral spring or any other type of a spring of metal, plastic, or any other material.

Such a vibration attenuator, which is resilient in all directions, attenuates or prevents revolving of the compass rose 1, because when the compass rose 1 moves to the side by the effect of vibration, the support tip 3 does not rise out of its bearing recess, but remains therein, and the support rod 9, which is a component having little mass, moves to the side along with the compass rose, because the support rod 9 is resiliently attached to the compass frame. No other part of the compass rose 1 contacts the support rod 9, and no rotational (turning) forces can arise. Such a resilient vibration attenuator 8, also attenuates strong vertical impacts, which may occur, for example, when the compass is being installed in position or when the compass is being transported. Otherwise, such strong impact might cause breakdown of the bearing jewel 7, or flattening of the support tip 3.

As noted supra, the spring may be resilient in more than one direction, for example, in both a vertical or longitudinal direction, and a horizontal or lateral direction.

The present invention has been described above with reference to a preferred exemplifying embodiment of the present invention illustrated in drawing. However, the above description is no way intended to confine the present invention to only this illustrated embodiment. Many variations of the present invention are possible within the scope of the inventive concept described above.

What is claimed is:

1. In a compass, comprising a frame, a compass rose, a bearing for the compass rose, and a bearing support, the improvement comprising
means situated between said bearing support and said frame for resiliently interconnecting the same, for attenuating transfer of vibrations from said frame to said compass rose, for attenuating revolving of said compass rose due to such vibrations, and for attenuating any transfer of impact to said compass rose from surroundings thereabout, said means being resilient in both longitudinal and lateral directions, so that said means have freedom of movement in both the longitudinal and lateral directions.

2. The combination of claim 1, additionally comprising
a support bridge affixed to said compass frame, with said means being attached to said support bridge.

3. The combination of claim 1, wherein said means are constituted by an elastic member.

4. The combination of claim 3, wherein said elastic member is formed of rubber or plastic.

5. The combination of claim 1, wherein said means are constituted by spring means.

6. The combination of claim 1, wherein said bearing support is in the form of a substantially oblong, rod-shaped member.

7. The combination of claim 5, wherein said spring means are constituted by a metal spring.

8. The combination of claim 7, wherein said metal spring is a spiral spring.

9. The combination of claim 1, wherein said resilient means constitute the only means of connection between said compass rose and said frame.

10. The combination of claim 2, additionally comprising
an expansion membrane and a dome both substantially rigidly affixed to said frame, and
a collar for interconnecting said dome and expansion membrane to form a hermetically-sealed space within which said compass rose and said support bridge are situated.

11. The combination of claim 10, additionally comprising
a magnetic holder mounted upon said compass rose,
a magnet and weight each being attached to said magnetic holder,
a support tip of said compass rose resting upon said bearing, and
a sleeve for connecting said compass rose with said support tip thereof.

12. The combination of claim 1, wherein said bearing is substantially stationarily mounted on said support.

13. The combination of claim 10, wherein said hermetically-sealed space is filled with liquid.

14. The combination of claim 10, wherein said support bridge is substantially rigidly supported between said dome and said expansion membrane.

15. The combination of claim 2, wherein said support bridge is substantially rigidly affixed to said compass frame.

* * * * *